United States Patent [19]

Sanderson et al.

[11] Patent Number: 5,063,786
[45] Date of Patent: Nov. 12, 1991

[54] FLUID FLOW METERS

[75] Inventors: Michael L. Sanderson, Bedfors; John R. Heritage, Camberley, both of England

[73] Assignee: Severn Trent Water Limited, Birmingham, England

[21] Appl. No.: 596,419

[22] Filed: Oct. 12, 1990

Related U.S. Application Data

[63] Continuation of Ser. No. 472,386, Jan. 31, 1990, abandoned.

[30] Foreign Application Priority Data

Feb. 1, 1989 [GB] United Kingdom ............ 8902173

[51] Int. Cl.$^5$ .............................................. G01F 1/20
[52] U.S. Cl. ............................................ 73/861.19
[58] Field of Search ...................... 73/861.13, 861.19

[56] References Cited

U.S. PATENT DOCUMENTS 3,878,715 4/1975 Kobayashi .................. 73/861.22
4,550,614 11/1985 Herzl ........................ 73/861.19

FOREIGN PATENT DOCUMENTS 0251627 6/1986 European Pat. Off. .
0198317 11/1984 Japan .
0104222 6/1985 Japan .
0188817 9/1985 Japan .
2046916 11/1980 United Kingdom .

Primary Examiner—Herbert Goldstein
Attorney, Agent, or Firm—Oblon, Spivak, McClelland, Maier & Neustadt

[57] ABSTRACT

A fluid flow meter of the fluidic oscillator type and suitable for electrically conducting liquids, for example for metering domestic water supplies, comprises a feed back oscillator with magnets creating a magnetic field across at least one of the flow paths and a pair of electrodes detecting the resultant potential difference across the flow path. The frequency of the detected signal gives a measure of the flow rate and a counter of the cycles will give the total flow over a period.

10 Claims, 2 Drawing Sheets

FLUID FLOW METERS

This application is a continuation of application Ser. No. 07/472,386, filed Jan. 31, 1990, now abandoned.

This relates to a fluid flow meter for measuring the flow of liquids and operating on the fluidic oscillator principle.

It is well known that the frequency of oscillation of a fluidic oscillator is dependent (though not necessarily linearly) on the quantity of flow through it. This has been proposed as a basis for flow measurement, both of liquids and of gases. However it is by no means a straightforward matter, especially where the measurement is to be accurate within one or two per cent over a wide range, and where the pressure of the fluid may vary substantially.

One way of detecting the oscillations has, in previous proposals, been by the use of pressure sensors or thermal sensors. The pressure sensors may operate electromagnetically, for example by responding to the movement of a captive ball oscillated in a channel or slot placed between the two fluid channels.

A particular problem arises in the metering of water consumption, where it may be required to maintain the accuracy of measurement over a turn-down ratio of as much as 200 to 1. Whereas in such a case the velocity will change over a corresponding range of 200 to 1, the pressure fluctuations to be sensed will, over the same range of flow, change by a factor of 40,000 to 1. It is almost impossible to maintain any degree of accuracy over such a wide range of pressure-sensing using a single pressure sensor.

Accordingly it is desirable to sense the oscillations not by means that respond to pressure, but by some means in which the amplitude of the signal is dependent on the velocity, rather than the pressure, of the changes in fluid conditions, so that the dynamic range of the sensing signal is only of the same order as that of the fluid flow.

A further drawback of the known proposals is that they generally require external power for the sensing means, at least where these means are electric.

At the same time there is a strong incentive to replace the existing mechanical water meters, which have wearing parts and are open to corrosion as well as wear, and furthermore, with the increasing need for telemetry of the readings, they require the fitting of separate electric detecting means such as reed switches to produce an electric signal that can be further handled. Such switches involve an external power supply and a separate electrical equipment box alongside and separate from the mechanical meter.

A further drawback of the known mechanical meters is the lack of linearity at low flow rates, such as arise in domestic use, mainly as a result of 'stiction' of the moving parts.

An aim of the invention is therefore to provide a improved form of fluidic oscillator flow meter capable of handling a very wide turn-down range and requiring minimum power. Another aim is to achieve adequate linearity over the full range without requiring complex correction circuits or look-up tables.

According to one aspect of the invention we propose that the oscillations in a fluidic oscillator liquid flow meter should be detected electromagnetically by applying a magnetic field across the flow and detecting the resulting e.m.f. generated in the liquid itself across a pair of appropriately placed electrodes. The liquid must, of course, have sufficient electrical conductivity, but this can be very low, as what is being detected is only a potential difference, and no significant flow of electric current is required.

One very suitable liquid is ordinary water and the invention is of particular value in the metering of domestic water supplies, as this involves large turn-down ratios and the accuracy of measurement has to meet certain statutory requirements. Other advantages of the invention for this particular purpose are low cost, no maintenance (since there are no moving parts within the fluid flow) and minimal power requirements. There is in fact no need for any power for the sensor itself, since the e.m.f. is generated by the electromagnetic inductive effect, so the only power required is that for whatever means are involved in amplifying and handling the generated signal.

According to a further feature of the invention there are at least two pairs of electrodes, and they can be connected in push-pull effectively to double the signal, and by connecting them differentially errors can be eliminated, for example due to changes in electrochemical potentials on the electrodes due to static pressure fluctuations. They may be in the main flow paths or the feedback paths or both.

The fluidic oscillator may be of a generally known kind, although preferably the splitter is a transverse wall rather than a knife-edge, as this is found to give better reliable oscillation over the wide range of flows involved.

The magnetic field or fields are preferably generated by permanent magnets (thus involving no power supplies), and may be moulded into the casing of the oscillator during manufacture. If the magnets are made of an electrically non-conducting material such as plastics-bonded ferrite, their faces can form part of the walls of the channels, thus keeping the magnetic gaps as small as possible.

According to a further aspect of the invention, which may also be applied to fluidic flow meters using sensing means other than the electromagnetic means described above,, linearity, particularly at very low flows, is improved by a modification of the inlet nozzle such that instead of being of the usual rectangular cross-section, it is widened at the top or bottom, or both (the terms top and bottom being defined when thinking of the plane of symmetry of the oscillator as vertical). The widening may be of a step-like nature and give the overall cross-section the profile of a T or a I, as will become clear later.

An example of a fluidic oscillator flow meter suitable for metering domestic water supplies is illustrated in the accompanying drawings, in which.

Figure 1:
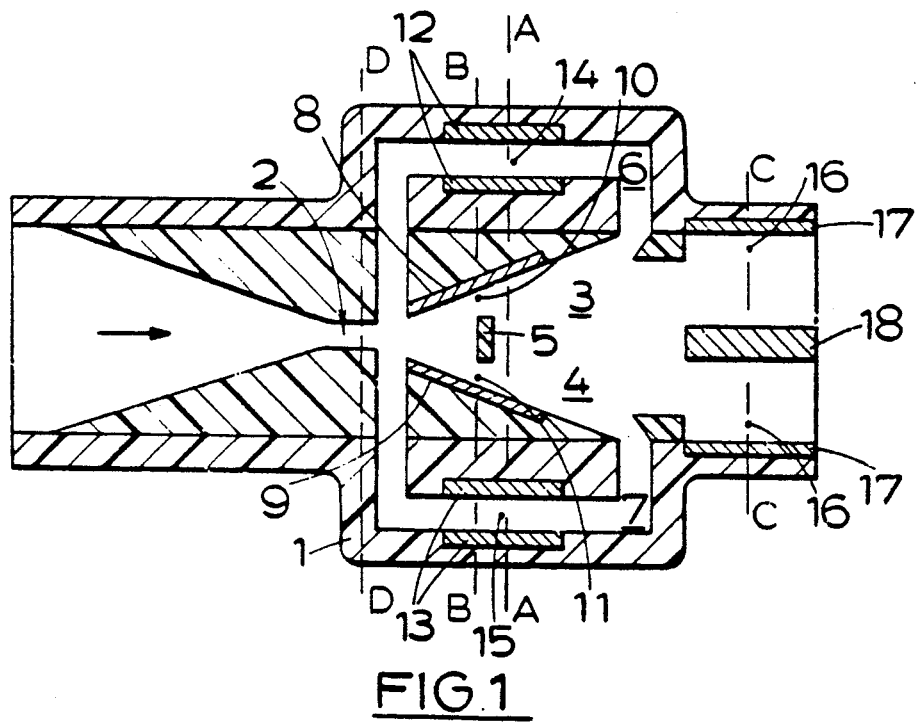
FIG. 1 is longitudinal section through the meter on its main axis.

The fluidic oscillator illustrated in FIG. 1 is of a basically known kind, with body 1 containing an inlet jet 2 of rectangular cross-section leading into a pair of channels 3 and 4 separated by a splitter 5 which in this case is a flat wall transverse to the flow. Feedback loops 6 and 7 from the main channels lead back to opposite sides of the path of the fluid adjacent to the inlet jet 1. As is well-known, the flow of fluid will attach itself to the wall of one of the channels by the Coanda effect, but then as a result of the action of the fluid fed back, it will switch across to the other wall, repeatedly switching back and forth at a frequency dependent upon the rate of flow. This is a so-called feedback oscillator. Another kind known is a relaxation oscillator, the operation of which is analogous to an electronic free-running flip-flop or relaxation oscillator, but the present invention is applicable primarily to a feedback oscillator, as the known relaxation oscillators are less stable.

In a typical case the frequency may vary over a range of 0.15 to 30 Hz for a flow range from 0.15 liters a minute to 30 liters per minute, assuming the dimensions and characteristics are such as to produce 60 cycles for every liter of water that passes.

To achieve the sensing according to the invention we mount permanent magnets in the walls of the channels to produce magnetic fields crossing the paths of flow of the water. In the simplest version it would be sufficient to have a single field in a single channel, but in practice, for the reasons given below, there is more than one.

Magnets 8 and 9 form part of the walls of the channels 3 and 4 respectively. Between them they produce a field across both channels and as the flow of water switches from one channel to the other the change in velocity in the water in each channel in turn produces an e.m.f. perpendicular to the flow and to the field, this e.m.f. being detected in the channel 3 by a pair of electrodes 10 and in channel 4 by a pair of electrodes 11, the disposition of these being shown in FIG. 3.

It will be appreciated that the voltages appearing across the two pairs of electrodes will alternate and so if they are connected in a push-pull circuit a signal of double amplitude will be obtained.

In the example illustrated we also have further pairs of magnets 12 and 13 producing fields across the feedback loops 6 and 7 and the resulting e.m.f.s are picked up by pairs of electrodes 14 and 15. These may be used instead of those in the main channel, i.e. it is not necessary to have both sets, but by providing both and then measuring the ratio of the magnitudes of these two signals, it is possible to compensate, at least to a first order, for non-linearities in the meter factor as a function of flowrate.

The magnets may be of a known commercially available kind, for example samarium-cobalt, but as these sintered magnets are electrically conducting it is necessary to insulate them from the actual water in the channels to prevent them short-circuiting the e.m.f.s. generated. If the body 1 of the meter is of moulded plastics this is not difficult, as the plastics material can be moulded around the magnets, but it means that the magnetic gaps are wider than necessary, making the fields that much weaker. We therefore prefer to use an electrically insulating magnetic material such as a plastics-bonded ferrite, and expose the magnets to the flow, making the magnetic gaps equal to the width of the fluid channels.

If a greater field strength is required than can be produced by individual spaced magnets one could use semi-closed magnetic circuits, i.e. horseshoe magnets or externally placed magnets with pole shoes placed in the positions of the magnets shown in the drawings. The whole of the region between each main channel and the adjacent feedback loop may be formed by a magnet.

Figure 3:
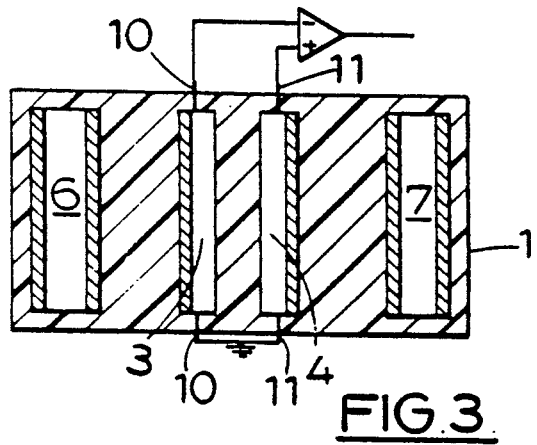
FIG. 3 is a transverse section on the line B—B in FIG. 1.
Figure 4:
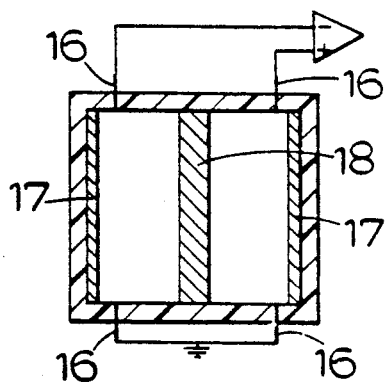
FIG. 4 is a transverse section on the line C—C in FIG. 1.

In the feedback loops the line joining the electrodes is in the middle of the flow path, but in the main channels it is as close as possible to the wall, as shown in FIG. 3. The voltage generated in the feedback loop, tends to be smaller than that generated in the main channel because although there is a stronger field than in the main jet resulting from a shorter flux path, the velocity of the main jet is significantly higher than the velocity of fluid in the feedback loop. Shorting of the induced signal in the main jet means that the e.m.f.s. generated in the main jet are typically greater than those induced in the feedback loop only by a factor 2.

In the example illustrated there are also electrodes 16 and magnetic fields produced by magnets 17 and 18 in the exit path for the fluid. The central magnet 18 forms a divider that keeps the two paths still separate at this point. However this is only a possible alternative to the sensors in the main channels and/or feedback loops, and it is generally not necessary to provide all three sets of electrodes simultaneously. Indeed, as indicated earlier, a single field and a single pair of electrodes is sufficient to put the invention into practice.

Figure 2:
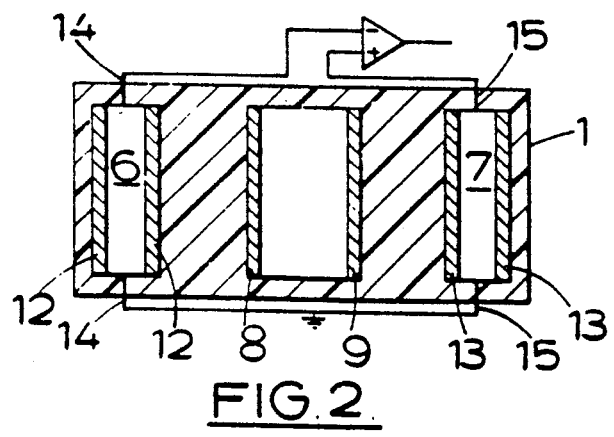
FIG. 2 is a transverse section on the line A—A in FIG. 1.

As will be seen in FIGS. 2 and 3 the signals from the two feedback loops are fed to the inverting and non-inverting inputs of a differential amplifier, effectively connecting them in push-pull, and those from the main channels are connected to another operational amplifier. The outputs from these amplifiers may be combined in whatever appears to be the best way, for example the ratio between them is a signal which is independent of many external factors.

The further processing of the signals need not concern us here; suffice it to say the we obtain signals of as large initial amplitude as possible (it is typically of the order of 2 to 400 microvolts) and measure its frequency as an indication of the rate of flow and/or we count the total number of cycles over a period to give a measure of the total flow. If the relationship between the frequency and the rate of flow is not sufficiently linear over the required range the instrument may be calibrated and the result of the calibration may be used to programme a correction circuit, in effect a series of look-up tables, through which the signal is passed to produce a final figure representing fluid flow. This can be incorporated in a microchip which can be mounted in or on the casing of the instrument, and the whole instrument is self-contained, complete with its electrical data-recording provisions. As the signal from the electrodes is generated by the flow itself, no external source of voltage is needed for this, and the only power supply that is required is that necessary for the signal-handling circuits. This very low requirement can be handled by a battery mounted on the instrument and having a useful life measured in years.

Figure 6:
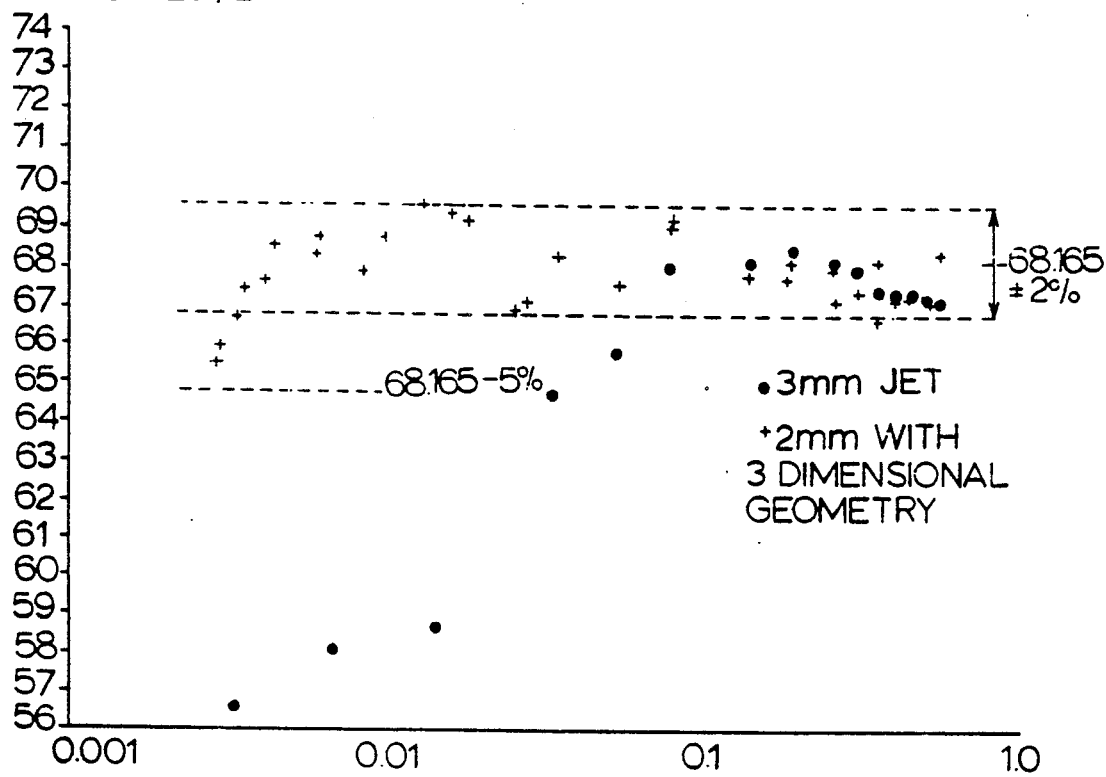
FIG. 6 is a graph of oscillator frequency against flow, showing the results of calibration tests and illustrating the advantages of the modification in FIG. 5.

However, the use of correction circuits is undesirable and it is better, if possible, to achieve linearity over the desired range directly by the inherent design. FIG. 6 is a graph of calibration tests in which the number of pulses or cycles per liter of flow is plotted against the rate of flow. The horizontal scale is logarithmic covering from 0.001 liters per second to 1 liter per second. Ideally the points should lie on a single horizontal line. The graph reveals that with a jet 3 mm wide, at least for flows greater than 0.05 liters per second, the pulse rate per liter is within 2% of a mean figure of 68.165, but at lower flow rates it falls off badly to around 57 pulses per liter at a flow rate of around 0.0035 liters per second. It must be remembered here that we are concerned solely with the frequency of the fluidic oscillator, and this has nothing to do with the manner in which it is detected, whether it be electromagnetic (such as described earlier) or one of the known ways.

Figure 5:
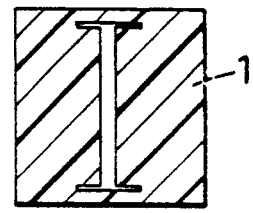
FIG. 5 is a transverse section on the line D—D in FIG. 1, showing a modification.

FIG. 5 shows a possible way which has been found to improve the linearity of response, in particular at low flow rates. Instead of the inlet jet being of plain rectangular cross-section, it is broadened out at the top and bottom to form an I section; it may be sufficient to broaden it only at one end. At the same time its width may be decreased. FIG. 6 shows the substantial improvement obtained with a jet which is 2 mm wide but has lateral slots top and bottom in the manner shown in FIG. 5. The response is linear to within 2% down to 0.004 liters per second and to within 5% right down to 0.003 liters per second.

The reason for this improvement is not at present fully understood, but it is believed that at low flowrates the paths on the top and bottom of the jet provide a source of additional flow to that in the feedback loop to cause the jet to switch. At higher flowrates the impedance of the paths on the top and bottom of the jet to fluctuating flows are such that the path cannot provide the additional flow. This mechanism has the effect of increasing the switching rate at low flows.

We claim:

1. A meter for measuring the flow of electrically conducting liquids comprising a feedback fluidic oscillator of the kind having structure defining an entry channel and a splitter dividing flow from that entry channel into first and second main channels, and first and second feedback channels leading respectively from said first and second main channels to respective opposite sides of a point in said entry channel, whereby the flow of liquid from said entry channel is switched repeatedly in a regular manner between said main channels alternately, first and second electrodes spaced apart in at least one of said main and feedback channels, means creating a magnetic field across said at least one channel in a direction transverse to said one channel and to a line joining said electrodes, and means responsive to the resultant voltage generated between said first and second electrodes.

2. The fluid flow meter set forth in claim 1 wherein said at least one flow channel is one of said main channels.

3. The fluid flow meter set forth in claim 1 wherein said at least one flow channel is one of said feed-back channels.

4. The fluid flow meter set forth in claim 1 further including third and fourth electrodes spaced apart in a second one of said channels, means producing a magnetic field across aid second channel, and means responsive to the resultant voltage generated between said third and fourth electrodes.

5. The fluid flow meter set forth in claim 4 including means combining responses to said voltages.

6. The fluid flow meter set forth in claim 5 wherein said first and second flow channels are ones in which the flow changes in opposite senses and said voltages from said electrodes are combined in push-pull.

7. The fluid flow meter set forth in claim 1 wherein said means for creating a magnetic field comprise at least one permanent magnet.

8. The fluid flow meter set forth in claim 7 wherein said structure comprises an electrically insulating casing having walls and said magnet is embedded in a wall of said casing and is electrically insulated from said one flow channel.

9. The fluid flow meter set forth in claim 7 wherein said magnet is of electrically non-conducting material and forms part of a wall of said one flow channel.

10. The fluid flow meter set forth in claim 1 wherein, upstream of said point, said entry channel is of a cross-section which is basically rectangular but is broadened out laterally at at least one end of the rectangular cross-section to form an I-shaped or T-shaped cross-section.

* * * * *